(12) United States Patent
Kitaguchi et al.

(10) Patent No.: US 11,136,272 B2
(45) Date of Patent: Oct. 5, 2021

(54) METHOD OF PRODUCING FIRED CERAMIC ARTICLE AND METHOD OF FIRING CERAMIC GREEN BODY

(71) Applicant: NGK INSULATORS, LTD., Nagoya (JP)

(72) Inventors: Daniel Yukichi Kitaguchi, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 304 days.

(21) Appl. No.: 16/196,057

(22) Filed: Nov. 20, 2018

(65) Prior Publication Data
US 2019/0218147 A1 Jul. 18, 2019

(30) Foreign Application Priority Data
Jan. 15, 2018 (JP) .............................. JP2018-004368

(51) Int. Cl.
| | | |
|---|---|---|
| C04B 35/64 | (2006.01) | |
| C04B 38/00 | (2006.01) | |
| F27D 7/06 | (2006.01) | |
| B28B 11/24 | (2006.01) | |
| C04B 35/638 | (2006.01) | |
| B28B 17/00 | (2006.01) | |
| F27D 5/00 | (2006.01) | |
| F27B 9/04 | (2006.01) | |
| F27D 19/00 | (2006.01) | |

(52) U.S. Cl.
CPC ............ *C04B 35/64* (2013.01); *B28B 11/243* (2013.01); *B28B 17/0081* (2013.01); *C04B 35/638* (2013.01); *C04B 38/0006* (2013.01); *F27D 5/0031* (2013.01); *F27D 7/06* (2013.01); *C04B 2235/3481* (2013.01); *C04B 2235/6562* (2013.01); *C04B 2235/6583* (2013.01); *C04B 2235/6584* (2013.01); *C04B 2235/6585* (2013.01); *F27B 9/045* (2013.01); *F27D 2007/063* (2013.01); *F27D 2019/0012* (2013.01); *F27D 2019/0018* (2013.01); *F27D 2019/0068* (2013.01)

(58) Field of Classification Search
CPC .... C04B 2235/6583; C04B 2235/6584; C04B 38/0006–0019
See application file for complete search history.

(56) References Cited

U.S. PATENT DOCUMENTS

| | | | | |
|---|---|---|---|---|
| 6,027,684 | A * | 2/2000 | Gheorghiu | .......... C04B 38/0006 264/631 |
| 9,650,304 | B2 | 5/2017 | Miyata et al. | |
| 2002/0003322 | A1* | 1/2002 | Dull | ....................... C04B 35/64 264/630 |
| 2007/0054229 | A1* | 3/2007 | Hanzawa | ................ C04B 38/06 432/266 |
| 2009/0298670 | A1* | 12/2009 | Murtagh | ............. C04B 38/0009 501/80 |

(Continued)

FOREIGN PATENT DOCUMENTS

WO 2012/128172 A1 9/2012

*Primary Examiner* — Erin Snelting
(74) *Attorney, Agent, or Firm* — Burr & Brown, PLLC

(57) ABSTRACT

The present disclosure is related to a method of producing a fired ceramic article. The method may include: heating a ceramic green body in a kiln, and controlling oxygen concentration in the kiln such that the oxygen concentration swings during the heating of the ceramic green body.

18 Claims, 4 Drawing Sheets

(56) References Cited

U.S. PATENT DOCUMENTS

| | | | |
|---|---|---|---|
| 2012/0241998 A1* | 9/2012 | Suzuki | C04B 38/0006 |
| | | | 264/239 |
| 2014/0011150 A1* | 1/2014 | Miyata | C04B 35/638 |
| | | | 432/133 |
| 2014/0011151 A1* | 1/2014 | Miyata | C04B 33/32 |
| | | | 432/149 |
| 2014/0138882 A1* | 5/2014 | Castilone | C04B 35/64 |
| | | | 264/666 |
| 2014/0252695 A1* | 9/2014 | Beall | C04B 38/0038 |
| | | | 264/631 |
| 2015/0028527 A1* | 1/2015 | Bronfenbrenner | C04B 38/0006 |
| | | | 264/631 |
| 2015/0050609 A1* | 2/2015 | Beall | C04B 33/32 |
| | | | 432/9 |
| 2016/0067676 A1* | 3/2016 | Kadota | B01J 37/0009 |
| | | | 502/439 |
| 2018/0148382 A1* | 5/2018 | Wing | B01D 46/2418 |
| 2018/0243942 A1* | 8/2018 | Kitaguchi | C04B 35/195 |

\* cited by examiner

[FIG. 1]
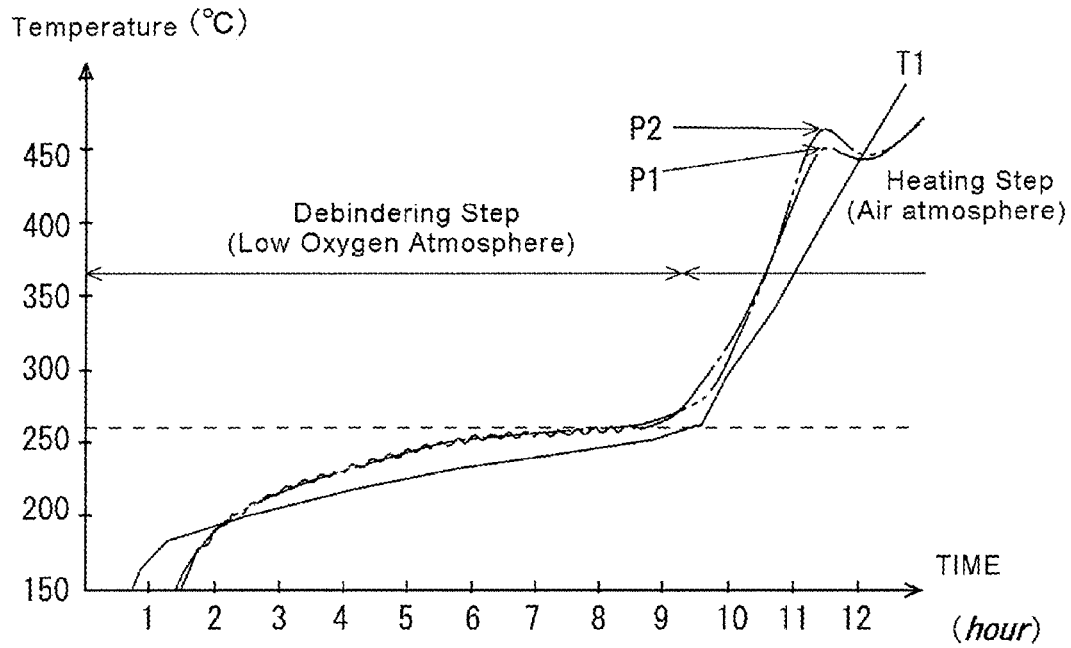
FIG. 2
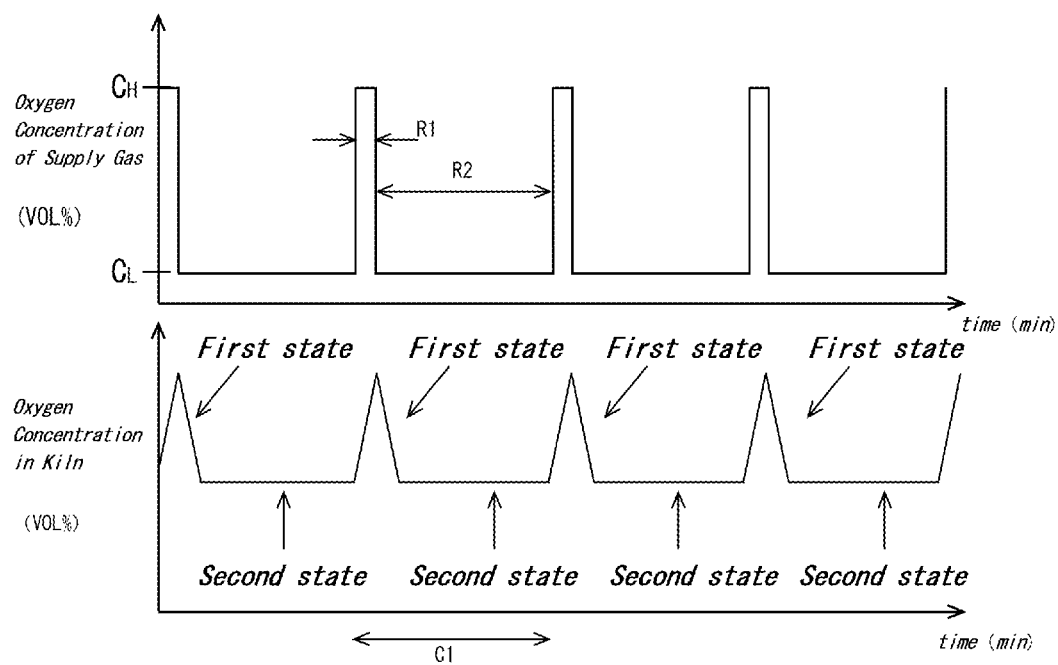

METHOD OF PRODUCING FIRED CERAMIC ARTICLE AND METHOD OF FIRING CERAMIC GREEN BODY

CROSS-REFERENCE TO RELATED APPLICATION

The present application claims a priority of Japanese Patent Application No. 2018-4368, filed on Jan. 15, 2018, the entire content of which is expressly incorporated herein by reference.

TECHNICAL FIELD

The present disclosure is generally directed to a method of producing a fired ceramic article and a method of firing a ceramic green body.

BACKGROUND

International Publication Laid-open No. 2012/128172 discloses that an exhaust gas of low-oxygen concentration exhausted from a burner is injected into a preheating zone.

SUMMARY

When a ceramic green body is fired in a low-oxygen atmosphere, a carbon content of an organic binder in a ceramic green body burns moderately, thus suppressing cracks being formed in the ceramic green body. However, this may result in increased amount of carbon remaining in the ceramic green body, and may result in sudden burning of the remaining carbon during the following step of heating performed after the low-oxygen atmosphere is shifted to an air atmosphere. This may possibly result in cracks being formed in the resulting fired ceramic article. As such, there is a demand to remove the carbon content of the organic binder in the ceramic green body so as not to result in the cracks formed in the fired ceramic article.

A method of producing a fired ceramic article according to an aspect of the present disclosure may include:
heating a ceramic green body in a kiln; and
controlling oxygen concentration in the kiln such that the oxygen concentration swings during the heating of the ceramic green body.

In some embodiments, said controlling the oxygen concentration in the kiln such that the oxygen concentration swings during the heating of the ceramic green body may be performed based on fluctuating oxygen concentration of a gas supplied into the kiln.

In some embodiments, said fluctuating the oxygen concentration of a gas supplied into the kiln may include switching a gas supplied into the kiln at least between a first gas having a first oxygen concentration and a second gas having a second oxygen concentration that is lower than the first oxygen concentration.

In some embodiments, the first oxygen concentration is equal to or less than 21 vol %.

In some embodiments, the first oxygen concentration is equal to or less than 15 vol %.

In some embodiments, the second oxygen concentration is equal to or less than 5 vol %.

In some embodiments, a time period of supplying the first gas in one cycle is shorter than a time period of supplying the second gas in one cycle.

In some embodiments, $3<((E+F)/R)<13$ is satisfied, where

E represents a first supply amount calculated by multiplying the first oxygen concentration of the first gas and the time period of supplying the first gas in one cycle;

F represents a second supply amount calculated by multiplying the second oxygen concentration of the second gas and the time period of supplying the second gas in one cycle;

R represents a time period of one cycle; and an average supply amount of oxygen in one cycle is represented by $((E+F)/R)$.

In some embodiments, said heating a ceramic green body in a kiln may include:
first temperature-rising step, at a first temperature-rising rate, up to a target temperature in a temperature range over 180° C.; and
second temperature-rising step, at a second temperature-rising rate that is greater than the first temperature-rising rate, after the temperature in the kiln reached the target temperature.

In some embodiments, said controlling oxygen concentration in the kiln such that the oxygen concentration swings during the heating of the ceramic green body is performed in said first temperature-rising step.

In some embodiments, the target temperature is equal to or less than 300° C.

In some embodiments, the atmosphere in the kiln is shifted from a low-oxygen atmosphere to an air atmosphere synchronously when the temperature of the atmosphere in the kiln reaches the target temperature.

In some embodiments, said controlling oxygen concentration in the kiln such that the oxygen concentration swings during the heating of the ceramic green body is performed when the atmosphere temperature in the kiln is equal to or less than 300° C.

In some embodiments, the ceramic green body has a honeycombed structure built by cell-walls defining cells.

A method of firing ceramic green body according to an aspect of the present disclosure may include:
heating a ceramic green body in a kiln;
controlling oxygen concentration in the kiln such that the oxygen concentration swings during the heating of the ceramic green body.

A kiln according to an aspect of the present disclosure may be controlled by a controller such that an oxygen concentration swings in the kiln. The kiln may be a continuous kiln such as a tunnel kiln, a roller hearth kiln and so on, or a batch kiln such as a shuttle kiln and so on that is capable of performing steps of debindering and the following firing in the same space.

According to an aspect of the present disclosure, it would be possible to remove a carbon content of an organic binder in a ceramic green body so as not to result in cracks being formed in the fired ceramic article.

BRIEF DESCRIPTION OF DRAWINGS

Hereinafter, non-limiting embodiments of the present disclosure will be described with reference to FIGS. 1 to 5 in which like numerals of reference indicate like parts. A skilled person would be able to combine respective embodiments and/or respective features without requiring excess descriptions, and would appreciate synergistic effects of such combinations. Overlapping descriptions among the embodiments would be basically omitted. Referenced drawings are prepared for the purpose of illustration of invention, and might possibly be simplified for the sake of convenience of illustration.

FIG. 1 is a schematic graph showing that, in a step of firing according to a non-limiting embodiment of the present disclosure, a large difference is caused between magnitudes of temperature peaks during a step of heating, depending onto a condition whether a step is performed for controlling, in a kiln, oxygen concentration to swing during debindering in a low-oxygen atmosphere. The temperature peak during the step of heating is considered as originating from burning of unburned remaining carbon in the ceramic green body after the step of debindering.

FIG. 2 is a schematic graph showing fluctuation of oxygen concentration of gas supplied into a kiln during a step of debindering and fluctuation of oxygen concentration inside the kiln, according to an aspect of the present disclosure.

DETAILED DESCRIPTION

In the following descriptions, a plurality of features described for a method of producing a fired ceramic article and/or a method of firing a ceramic green body would be understood as individual features independent to other features, additionally to as combination with other features. The respective features would be understood as individual features without requiring combination with other features, but could be understood as combination with one or more another or other features. Describing all combinations of individual features would be redundant for a skilled person, and thus omitted. The individual features would be identified by a language of "In some cases". The individual features would be understood as a universal feature that is effective not only to a method of producing and/or a method of firing disclosed in the present application, but also effective to other various methods of producing and/or methods of firing not particularly described in the present specification.

Figure 3:
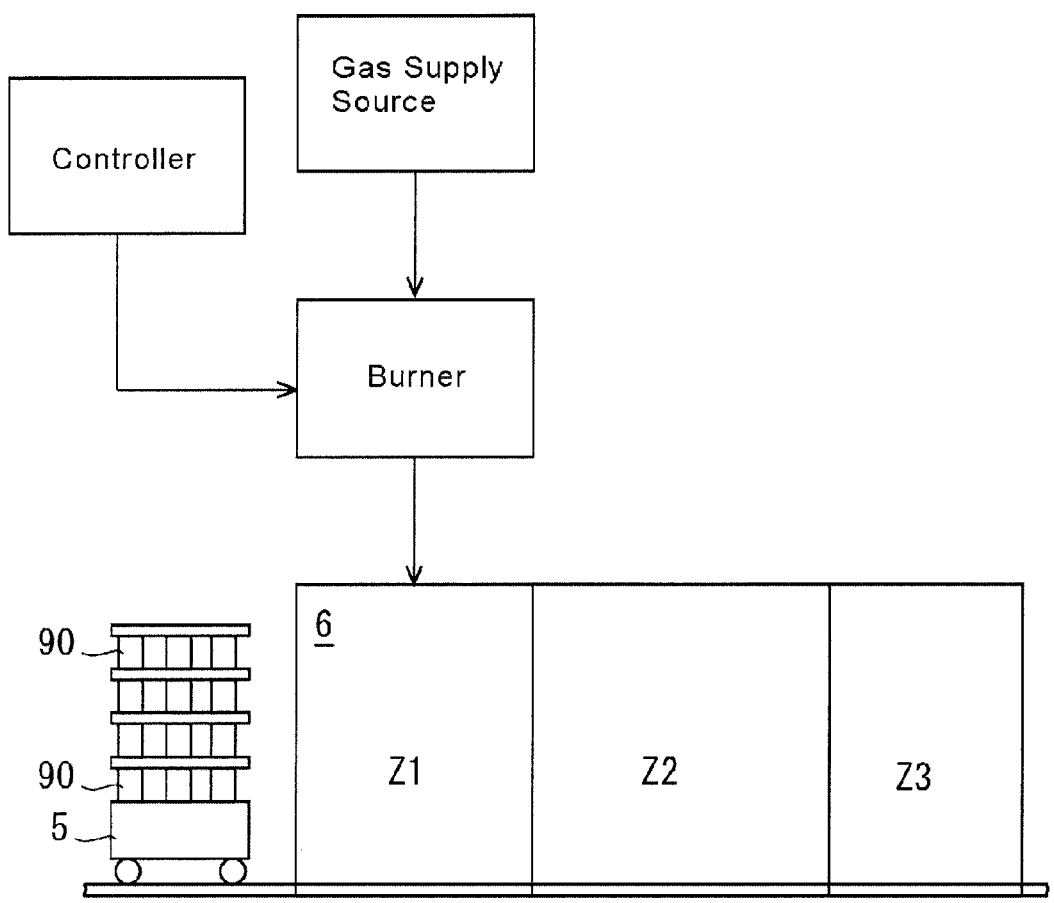
FIG. 3 is a schematic view of a kiln according to an aspect of the present disclosure.
Figure 4:
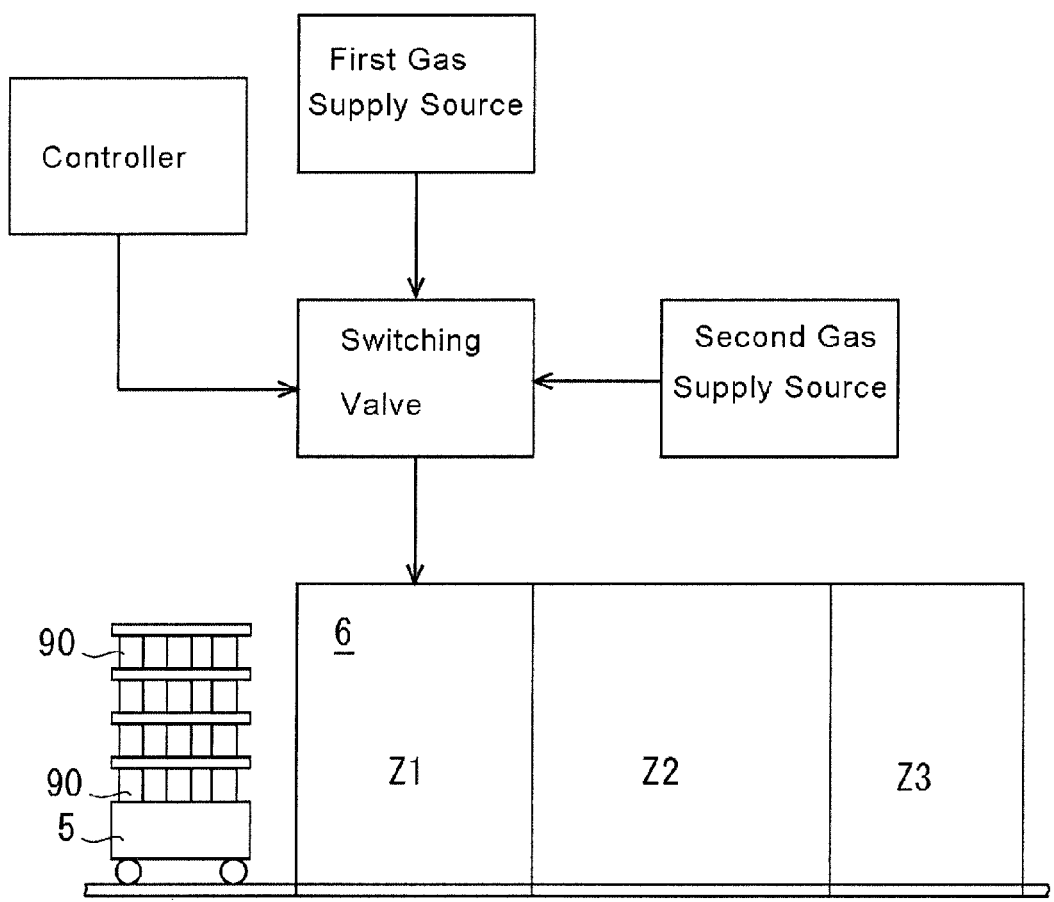
FIG. 4 is a schematic view of a kiln according to another aspect of the present disclosure.
Figure 5:
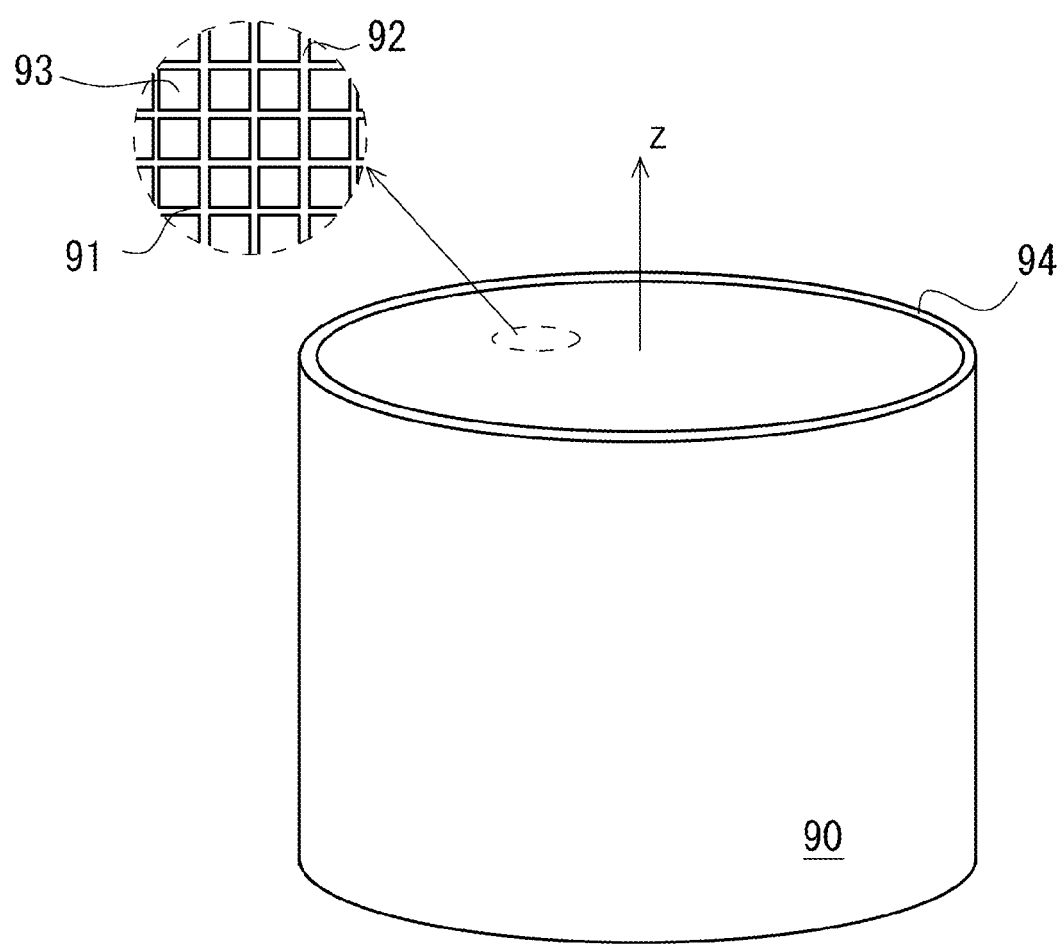
FIG. 5 is a schematic perspective view of a ceramic green body according to an aspect of the present disclosure, showing an enlarged lattice structure of cell-walls in a dotted circle.

FIG. 1 is a schematic graph showing that, in a step of firing according to a non-limiting embodiment of the present disclosure, a large difference is caused between magnitudes of temperature peaks during a step of heating, depending onto a condition whether a step is performed for controlling, in a kiln, oxygen concentration to swing during debindering in a low-oxygen atmosphere. The temperature peak during the step of heating is considered as originating from burning of unburned remaining carbon in the ceramic green body after the step of debindering. FIG. 2 is a schematic graph showing fluctuation of oxygen concentration of gas supplied into a kiln during a step of debindering and fluctuation of oxygen concentration inside the kiln. FIG. 3 is a schematic view of a kiln. FIG. 4 is a schematic view of a kiln according to another embodiment. FIG. 5 is a schematic perspective view of a ceramic green body, showing an enlarged lattice structure of cell-walls in a dotted circle.

A kiln may be used for firing ceramic green bodies. A kiln may be a continuous kiln such as a tunnel kiln, a roller hearth kiln and so on, or a batch kiln such as a shuttle kiln and so on that is capable of performing steps of debindering and the following firing in the same space, but may include any other types of kilns. In a kiln, debindering of a ceramic green body is performed at an atmosphere temperature (a temperature in a kiln) equal to or less than 300° C., and the following heating and/or sintering of the (debindered) ceramic green body is performed at an atmosphere temperature over 300° C. A step of firing of the present disclosure includes a step of debindering where the ceramic green body is heated at an atmosphere temperature equal to or less than 300° C. Note that, the step of debindering is a step of heating and removing an organic binder included in the ceramic green body, and may be referred to as a step of removing binders.

A ceramic green body to be fired may be a molded body of clay including raw material which will be cordierite ($2MgO/2Al_2O_3/5SiO_2$) through firing. The ceramic green body includes an organic binder that will disappear through the step of debindering. Optionally, the ceramic green body further includes a dispersion medium such as water. The raw material that will be cordierite ($2MgO/2Al_2O_3/5SiO_2$) through firing may be referred to as a precursor material of cordierite (or simply as a raw material of cordierite). The precursor material of cordierite may have a chemical composition which includes 40-60 mass % of silica, 15-45 mass % of alumina, and 5-30 mass % of magnesia. The precursor material of cordierite may be a mixture of plural inorganic raw materials selected from a group consisting of talc, kaolin, calcined kaolin, alumina, aluminum hydroxide, and silica. The organic binder may include at least one material selected from a group consisting of agar, hydroxypropylmethylcellulose, methylcellulose, hydroxyethylcellulose, carboxymethylcellulose, and polyvinyl alcohol. When a ceramic green body includes a precursor material of cordierite, a firing temperature may be set between 1380-1450° C. or 1400-1440° C. A time period of firing may be 3-10 hours.

The ceramic green body may additionally include a porosifying agent. The porosifying agent may be any material that will disappear in the step of firing, and may include, for example, an inorganic substance such as coke, a polymer compound such as a foamed resin, an organic substance such as starch, or any combination thereof. The dispersion medium may include ethylene glycol, dextrin, fatty acid soap, polyalcohol or any combination thereof, additionally or alternatively to water.

The ceramic green body to be fired may be one produced through these materials being mixed and being extruded and molded by an extruder. Kneader or vacuum pug-mill etc. can be used for mixing precursor material of cordierite, organic binder, and dispersion medium and so on. The ceramic green body extruded by an extruder is soft clayey and can be deformed easily. In some cases, the ceramic green body extruded from an extruder is placed in a drying apparatus, and most moisture in the ceramic green body is removed through heating inside the drying apparatus. The ceramic green body heated in a kiln may thus has a reduced moisture compared to one before the step of drying. It should be noted that any common molding technique can be used other than extruding and molding of a ceramic green body.

An exemplary ceramic green body 90 illustrated in FIG. 5 has a honeycombed structure built by cell-walls 91, 92 defining cells 93. This honeycombed structure may be one molded in accordance with a die of an extruder. Opening shapes of cells 93 defined by the cell-walls 91, 92 may be a polygon with three or more corners. Honeycomb or honeycombed structure should not be limited to be a lattice structure where hexagonal cells 93 are defined by cell-walls, and may indicate other various lattice structures. In an example of FIG. 5, the cells 93 are square, and square opening shape of the cell 93 is defined by first cell-walls 91 extending in a first direction and second cell-walls 92 extending in a second direction that is perpendicular to the first direction. The outer periphery wall 94 of the ceramic green body 90 is a hollow-cylinder-like portion, and may have a thickness greater than that of the cell-walls 91, 92.

The ceramic green bodies can be variously transferred into a kiln. One or more ceramic green bodies are placed onto a cart 5, and the cart 5 passes through a kiln and during which, the ceramic green bodies 90 are fired (See FIGS. 3 and 4). It is envisioned that a stack of ceramic green bodies 90 is placed onto the cart 5 (See FIGS. 3 and 4). The kiln may be a kiln 6 that has an internal space divided into at least a debindering zone Z1, a firing zone Z2, and cooling zone Z3 (See FIGS. 3 and 4). In some cases, the oxygen concentration (and in turn, a temperature of the ceramic green body) in the debindering zone Z1 is controlled to swing based on control by a controller as would be understood from the following descriptions.

A method of producing a fired ceramic article according to the present disclosure may include: heating a ceramic green body in a kiln; and controlling oxygen concentration in the kiln such that the oxygen concentration swings during the heating of the ceramic green body. By controlling oxygen concentration in the kiln such that the oxygen concentration swings during the heating of the ceramic green body, a temperature of the ceramic green body would swing. The swinging of oxygen concentration can be replaced with the swinging of temperature of ceramic green body. That is, the step of controlling oxygen concentration in the kiln such that the oxygen concentration swings during the heating of the ceramic green body can be replaced with the step of controlling the oxygen concentration in the kiln such that a temperature of the ceramic green body swings during the heating of the ceramic green body.

The swing may have a constant or different cycle and/or a constant or different amplitude of swing. The swinging of oxygen concentration may indicate that the oxygen concentration changes between a constant or variable first oxygen concentration and a constant or variable second oxygen concentration. The first oxygen concentration and the second oxygen concentration are different oxygen concentrations. The temperature swing of ceramic green body may indicate that a temperature of ceramic green body changes between a constant or variable first temperature and a constant or variable second temperature. The first temperature and the second temperature are different temperatures. Note that, the oxygen concentration can be represented by vol %.

By the step of controlling oxygen concentration in the kiln such that the oxygen concentration swings during the heating of the ceramic green body, a first state in which burning of carbon content of organic binder included in the ceramic green body is facilitated and second state in which burning of the carbon content of organic binder is not facilitated compared to the first state are repeated alternately, allowing that more sufficient debindering is performed in much shorter time period. The carbon content of organic binder may indicate carbon included in chemical formula of organic binder. For example, when the organic binder is polyvinyl alcohol, the carbon content of organic binder indicates carbons included in a carbon principal-chain and/or side-chain of polyvinyl alcohol. As would be understood from FIG. 1, it would be possible to suppress a temperature peak during the following step of heating by performing a swinging-control of oxygen concentration in the step of debindering. However, the swinging-control of oxygen concentration should not be limited to be performed in the step of debindering, but may be usable for other steps such as the step of heating that follows the debindering step.

FIG. 1 is an observation of internal temperature change of the ceramic green body 90 during the steps of debindering and heating, with a temperature sensor being placed in the internal center of the ceramic green body 90 having a honeycombed structure illustrated in FIG. 5. A long and short dashed line in FIG. 1 shows that a temperature of the ceramic green body swings in accordance with swinging of oxygen concentration in the kiln while the ceramic green body is heated. A chain double-dashed line in FIG. 1 shows that swinging of temperature of ceramic green body in the kiln is not caused as a result of that the step is not performed for controlling oxygen concentration in the kiln such that the oxygen concentration swings during the heating of the ceramic green body.

Step of controlling oxygen concentration such that oxygen concentration swings in the kiln may be performed based on fluctuating oxygen concentration of a gas supplied into a kiln. For example, in a case where an inert gas (e.g. nitrogen or argon) and an oxygen are supplied to a kiln through separate supply pipes, an amount of oxygen supplied per unit time may be fluctuated so as to fluctuate oxygen concentration of the gas supplied to the kiln. In a case where a gas mixture of an inert gas and an oxygen is supplied to a kiln through a single supply pipe, the oxygen concentration of the gas mixture may be fluctuated so as to fluctuate oxygen concentration of the gas mixture supplied to the kiln. An amount of gas supplied to the kiln may be sufficient for controlling the atmosphere, i.e. oxygen concentration in a kiln.

Fluctuating the oxygen concentration of a gas supplied into a kiln may include repeating a cycle of alternately supplying into the kiln a first gas having a first oxygen concentration $C_H$ and a second gas having a second oxygen concentration $C_L$ that is lower than the first oxygen concentration, not necessarily limited to this through. For example, as shown in FIG. 2, the first gas having the first oxygen concentration $C_H$ and the second gas having the second oxygen concentration $C_L$ are alternately supplied to a kiln. When the first gas having the first oxygen concentration $C_H$ is supplied, the atmosphere would be in a first state where burning of carbon content of organic binder is facilitated. When the second gas having the second oxygen concentration $C_L$ is supplied, burning of the carbon content of organic binder is not facilitated. A kiln may have some internal space, and thus it is expected that oxygen concentration in a kiln may change with a delay relative to the timing of switching between the first and second gasses. In a case of FIG. 2, a swinging waveform of oxygen concentration in a kiln includes plural triangular waves which appear at constant intervals. The swinging of oxygen concentration indicates that the oxygen concentration fluctuates between a constant or variable first oxygen concentration $C_H$ and a constant or variable second oxygen concentration $C_L$. The swinging waveform of oxygen concentration in a kiln may change largely dependent to fluctuated amount and rate of oxygen concentration of a supply gas. In FIG. 2, an oxygen concentration swings between two values of the first oxygen concentration $C_H$ and the second oxygen concentration $C_L$, but it is envisaged that an oxygen concentration of a supply gas swings between three or more values.

In some promising embodiments, the first oxygen concentration $C_H$ may be equal to or less than 21 vol % and/or equal to or greater than 15 vol %. It should be noted that, cases are envisioned where the first oxygen concentration $C_H$ is over 21 vol % and/or less than 15 vol %. The second oxygen concentration $C_L$ may be equal to or less than 5 vol %. A case is envisioned where the second oxygen concentration $C_L$ exceeds 5 vol %.

In some cases, a time period of supplying the first gas in one cycle is shorter than a time period of supplying the second gas in one cycle, not necessarily limited to this through. As shown in FIG. 2, in a supplying cycle C1 of first and second gases, a time period R1 of supplying the first gas is shorter than a time period R2 of supplying the second gas. Accordingly, excess burning of carbon in ceramic green bodies would be effectively suppressed. Additionally or alternatively, it is facilitated that a step of debindering is performed in a lower-oxygen atmosphere.

In some cases, the time period R1 of supplying the first gas is equal to or less than 15 minutes or 12 minutes. If the time period R1 of supplying the first gas is long, depending onto the first oxygen concentration of the first gas $C_H$ though, low-oxygen atmosphere may not be maintained and excess burning of carbon in the ceramic green body may be facilitated in short period of time, possibly causing cracks in the ceramic green body.

In some cases, the time period R2 of supplying the second gas is equal to or greater than 10 minutes and equal to or less than 30 minutes. If the time period R2 of supplying the second gas is long, carbon in ceramic green body may not burn sufficiently and suppression of temperature peak during the step of heating may possibly be difficult to be facilitated, depending onto the second oxygen concentration $C_L$ through. If the time period R2 of supplying the second gas is too short, there is a possibility that low-oxygen atmosphere cannot be maintained.

Fluctuating oxygen concentration of gas supplied into a kiln and cycles of alternately supplying to a kiln a first gas having a first oxygen concentration $C_H$ and a second gas having a second oxygen concentration $C_L$ would be achieved through various methods. A burner (See FIG. 3) can be used to control oxygen concentration of a gas supplied to a kiln. A switching valve (See FIG. 4) can be used to control oxygen concentration of a gas supplied to a kiln. The burner or the switching valve can be controlled by a controller. When the controller outputs a first signal (e.g. H-signal), the second gas having the second oxygen concentration $C_L$ is supplied to a kiln and, when the controller outputs a second signal (e.g. L-signal), the first gas having the first oxygen concentration $C_H$ is supplied to the kiln. The controller switches a state of switching valve, and can switch a supply gas between the first gas supply source and the second gas supply source.

A gas supply source shown in FIG. 3 may be the ambient air itself or a fan to flow the air through a pipe. A first gas supply source shown in FIG. 4 may be the ambient air itself or a fan to flow the air through a pipe. A second gas supply source shown in FIG. 4 may be a gas cylinder storing a gas having oxygen concentration lower than oxygen concentration of the air. Note that, the air may include 20.95 vol % oxygen, which may vary depending to the altitude and season.

The step of heating a ceramic green body in a kiln may include: a first temperature-rising step, at a first temperature-rising rate, up to a target temperature in a temperature range over 180° C.; and a second temperature-rising step, at a second temperature-rising rate that is greater than the first temperature-rising rate, after the temperature in the kiln reached the target temperature. The target temperature may be any temperature that is equal to or less than 300° C. In a case of FIG. 1, the target temperature is 260° C. In the first temperature-rising step before reaching this target temperature 260° C., a temperature (T1) in a kiln is increased at the first temperature-rising rate toward the target temperature 260° C. In the second temperature-rising step after reaching the target temperature 260° C., a temperature (T1) in a kiln is increased at the second temperature-rising rate that is greater than the first temperature-rising rate. The first temperature-rising step may be referred to as a step of debindering, and the second temperature-rising step may be referred to as a step of heating. The first temperature-rising rate may be 1° C./min to 50° C./min. The second temperature-rising rate may be 40° C./min to 150° C./min. In the first temperature-rising step, oxidation reaction of carbon content of organic binder in the ceramic green body with the oxygen in the kiln would be caused.

The step of controlling oxygen concentration in the kiln such that the oxygen concentration swings during the heating of the ceramic green body may be performed in the step of first temperature-rising step and/or at atmosphere temperature in a kiln equal to or less than 300° C., not necessarily limited to this through. This may lessen the extent of temperature peak of ceramic green body or lower the maximum value of temperature peak caused during the second temperature-rising step. The maximum value of temperature peak P1 during the step of heating shown by the long and short dashed line in FIG. 1 is lower than the maximum value of temperature peak P2 during the step of heating shown by the chain double-dashed line in FIG. 1. This avoids or suppresses that cracks are formed in the ceramic green body during firing of the ceramic green body or cracks are formed in the fired ceramic article after the firing.

In some cases, the atmosphere in the kiln may be shifted from a low-oxygen atmosphere to an air atmosphere synchronously when the temperature of the atmosphere in the kiln reaches the target temperature. The atmosphere in the kiln may be shifted from a low-oxygen atmosphere to an air atmosphere at the same timing when the temperature of the atmosphere in the kiln reaches the target temperature. Alternatively, the atmosphere in the kiln may be shifted from a low-oxygen atmosphere to an air atmosphere just before or just after the temperature of the atmosphere in the kiln reaches the target temperature. The low-oxygen atmosphere would be understood as an atmosphere having oxygen concentration lower than oxygen concentration in the ambient air. In a case where oxygen concentration in a kiln is controlled to swing in the low-oxygen atmosphere, average oxygen concentration would be lower than oxygen concentration in the ambient air. In some cases, an oxygen concentration in the air is deemed as 21 vol %, and an oxygen concentration or its average value in the low-oxygen atmosphere is less than 21 vol %. In a case of FIG. 1, an atmosphere in a kiln is shifted from a low-oxygen atmosphere to an air atmosphere just before the atmosphere temperature T1 reaches the target temperature 260° C. Accordingly, in the respective cases of the long and short dashed line and chain double-dashed line, this is followed by increases of internal temperatures of ceramic green bodies. This is a reflection of burning of carbon in the ceramic green body.

WORKING EXAMPLE

In working examples 1-7, a ceramic green body to be fired had a honeycombed structure shown in FIG. 5. Diameter, height, cell-wall thickness, and number of cells per 1 $cm^2$ (cpsi (cells per square inches)) were 330 mm, 152 mm, 4 mil, and 400 cpsi respectively. Ceramic material included in the ceramic green body was a precursor material of cordierite. The ceramic green body further included methyl cellulose of organic binder and water. Firing was performed under conditions shown in Chart 1 and under condition of heating similar to FIG. 1. It should be noted that oxygen concentration of a first gas is equal to oxygen concentration in the ambient air. Here, its variation was ignored, and it was assumed as 21 vol %. The debindering and heating steps were followed by sintering and cooling steps which were performed under standard conditions.

An average supply amount of oxygen in one cycle is represented by ((E+F)/R) where E represents a first supply amount calculated by multiplying the first oxygen concentration of the first gas and the time period of supplying the first gas in one cycle;

F represents a second supply amount calculated by multiplying the second oxygen concentration of the second gas and the time period of supplying the second gas in one cycle; and R represents a time period of one cycle.

For example, in the working example 1, E=21*2=42 for the first supply amount, and F=1*15=15 for the second supply amount. The average supply amount of oxygen in one cycle is (42+15)/17=3.4 (the second decimal place being rounded off). When calculating, oxygen concentration should be represented in vol %, and gas supply time period should be represented by the same time unit, e.g. second, minute, or hour. As would be understood from the Chart 1, in some cases, 3<((E+F)/R)<13 was satisfied. Supply amount of gas to a kiln was sufficient for controlling the atmosphere, i.e. oxygen concentration, in a kiln.

CHART 1

| Working example | Oxygen concentration of second gas | Time period R2 of supplying second gas | Oxygen concentration of first gas | Time period R1 of supplying first gas | Average supply amount |
| --- | --- | --- | --- | --- | --- |
| 1 | 1 vol % | 15 min. | 21 vol % | 2 min. | 3.4 vol % |
| 2 | 1 vol % | 11 min. | 21 vol % | 4 min. | 6.3 vol % |
| 3 | 1 vol % | 11 min. | 21 vol % | 4 min. | 6.3 vol % |
| 4 | 1 vol % | 18 min. | 21 vol % | 7 min. | 6.6 vol % |
| 5 | 1 vol % | 25 min. | 21 vol % | 10 min. | 6.7 vol % |
| 6 | 4 vol % | 11 min. | 21 vol % | 5 min. | 9.3 vol % |
| 7 | 4 vol % | 12 min. | 21 vol % | 12 min. | 12.5 vol % |

Results of evaluation of working examples 1-7 are shown in Chart 2. As to the swinging of temperature during the step of debindering, A represents that the swinging is clearly observed as in FIG. 1, and B represents that clarity is inferior to A. As to temperature peak during the step of heating, A represents that temperature peak is suppressed or the maximum value of temperature peak is lowered. B represents that an extent of suppression of temperature peak is inferior to A. In working examples 1-7, no cracks were formed in the fired ceramic article. Also, in working examples 1-7, the same result was obtained even by shortening the time period of debindering compared to the conventional time period. It should be note that, the chain double-dashed line in FIG. 1 represents a comparative example where no swinging control of oxygen was performed in the step of debindering, causing cracks in the ceramic green body during the firing.

CHART 2

| Working example | Swinging of temperature during step of debindering | Temperature peak during step of heating | Evaluation of cracks |
| --- | --- | --- | --- |
| 1 | A | B | None |
| 2 | A | A | None |
| 3 | A | A | None |
| 4 | A | A | None |
| 5 | B | A | None |
| 6 | B | A | None |
| 7 | B | A | None |

A skilled person in the art would be able to add various modifications to the respective embodiments based on the above teachings. Swinging may include sine waveform, sawtooth waveform, rectangular waveform, triangular waveform, or any combination thereof, or any combination of such waveform and linear line, slant line or curved line.

REFERENCE NUMBERS

5 Cart
6 Kiln
90 Ceramic molded body
93 Cell
94 Outer peripheral wall
C1 Supply cycle
$C_H$ First oxygen concentration
$C_L$ Second oxygen concentration
P1 Temperature peak
P2 Temperature peak
R1 Supply time period
R2 Supply time period
T1 Atmosphere temperature
Z1 Debindering zone
Z2 Firing zone
Z3 Cooling zone

The invention claimed is:

1. A method of producing a fired ceramic article comprising:
    heating a ceramic green body in a kiln at a temperature equal to or less than 300° C.; and
    controlling oxygen concentration in the kiln such that the oxygen concentration swings during the heating of the ceramic green body, wherein
    said controlling oxygen concentration in the kiln such that the oxygen concentration swings during the heating of the ceramic green body is performed based on fluctuating oxygen concentration of a gas supplied into the kiln.

2. The method of producing a fired ceramic article according to claim 1, wherein said fluctuating oxygen concentration of a gas supplied into the kiln includes switching a gas supplied into the kiln at least between a first gas having a first oxygen concentration and a second gas having a second oxygen concentration that is lower than the first oxygen concentration.

3. The method of producing a fired ceramic article according to claim 2, wherein the first oxygen concentration is equal to or less than 21 vol %.

4. The method of producing a fired ceramic article according to claim 3, wherein the first oxygen concentration is equal to or less than 15 vol %.

5. The method of producing a fired ceramic article according to claim 2, wherein the second oxygen concentration is equal to or less than 5 vol %.

6. The method of producing a fired ceramic article according to claim 1, wherein said heating a ceramic green body in a kiln comprises:
first temperature-rising step, at a first temperature-rising rate, up to a target temperature in a temperature range over 180° C.; and
second temperature-rising step, at a second temperature-rising rate that is greater than the first temperature-rising rate, after the temperature in the kiln reached the target temperature.

7. The method of producing a fired ceramic article according to claim 6, wherein said controlling oxygen concentration in the kiln such that the oxygen concentration swings during the heating of the ceramic green body is performed in said first temperature-rising step.

8. The method of producing a fired ceramic article according to claim 6, wherein the target temperature is equal to or less than 300° C.

9. The method of producing a fired ceramic article according to claim 6, wherein an atmosphere in the kiln is shifted from a low-oxygen atmosphere of less than 21 vol % to an air atmosphere synchronously when a temperature of the atmosphere in the kiln reaches the target temperature.

10. The method of producing a fired ceramic article according to claim 1, wherein said controlling oxygen concentration in the kiln such that the oxygen concentration swings during the heating of the ceramic green body is performed when an atmosphere temperature in the kiln is equal to or less than 300° C.

11. The method of producing a fired ceramic article according to claim 1, wherein the ceramic green body has a honeycombed structure built by cell-walls defining cells.

12. The method of producing a fired ceramic article according to claim 1, wherein said fluctuating oxygen concentration of a gas supplied into the kiln includes repeating a cycle of supplying different gases having different oxygen concentrations into the kiln in a predetermined order.

13. A method of producing a fired ceramic article, comprising:
heating a ceramic green body in a kiln; and
controlling oxygen concentration in the kiln such that the oxygen concentration swings during the heating of the ceramic green body, wherein
said controlling oxygen concentration in the kiln such that the oxygen concentration swings during the heating of the ceramic green body is performed based on fluctuating oxygen concentration of a gas supplied into the kiln, and
wherein said fluctuating oxygen concentration of a gas supplied into the kiln includes repeating a cycle of alternately supplying into the kiln a first gas having a first oxygen concentration and a second gas having a second oxygen concentration that is lower than the first oxygen concentration.

14. The method of producing a fired ceramic article according to claim 13, wherein the first oxygen concentration is equal to or less than 21 vol %.

15. The method of producing a fired ceramic article according to claim 14, wherein the first oxygen concentration is equal to or less than 15 vol %.

16. The method of producing a fired ceramic article according to claim 13, wherein the second oxygen concentration is equal to or less than 5 vol %.

17. The method of producing a fired ceramic article according to claim 13, wherein a time period of supplying the first gas in one cycle is shorter than a time period of supplying the second gas in one cycle.

18. The method of producing a fired ceramic article according to claim 13, wherein
$3<((E+F)/R)<13$ is satisfied, where
E represents a first supply amount calculated by multiplying the first oxygen concentration of the first gas and a time period of supplying the first gas in one cycle;
F represents a second supply amount calculated by multiplying the second oxygen concentration of the second gas and a time period of supplying the second gas in one cycle; and
R represents a time period of one cycle;
wherein oxygen concentration is in volume percent (vol %) and the time period is in any one of seconds, minutes, and hours.

* * * * *